United States Patent
Obara et al.

(10) Patent No.: US 7,213,160 B2
(45) Date of Patent: May 1, 2007

(54) POWER MANAGEMENT APPARATUS, POWER MANAGEMENT METHOD, AND POWER MANAGEMENT SYSTEM

(75) Inventors: Takenori Obara, Iwatsuki (JP); Megumi Fukui, Iwatsuki (JP); Yukihiro Fukuda, Iwatsuki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 480 days.

(21) Appl. No.: 10/386,518

(22) Filed: Mar. 13, 2003

(65) Prior Publication Data

US 2004/0015733 A1 Jan. 22, 2004

(30) Foreign Application Priority Data

Jul. 19, 2002 (JP) .............................. 2002-210719

(51) Int. Cl.
*G06F 1/00* (2006.01)
(52) U.S. Cl. ...................... 713/310; 713/324; 713/330; 714/1; 714/2; 714/3; 714/14
(58) Field of Classification Search ................ 713/401, 713/502
See application file for complete search history.

(56) References Cited

U.S. PATENT DOCUMENTS 5,537,584 A * 7/1996 Miyai et al. .................. 714/42
5,953,237 A * 9/1999 Indermaur et al. ........... 700/295
6,133,871 A * 10/2000 Krasner ................. 342/357.06
6,586,963 B2 * 7/2003 Choi et al. ..................... 326/26
2004/0135609 A1 * 7/2004 Horbelt ........................ 327/198

FOREIGN PATENT DOCUMENTS

CN     1125333       6/1996
JP     A 2000-89834  3/2000

OTHER PUBLICATIONS

English Language Translation of Office Action from People's Republic of China dated Jan. 13, 2006.

* cited by examiner

*Primary Examiner*—A. Elamin
*Assistant Examiner*—James F. Sugent
(74) *Attorney, Agent, or Firm*—Oliff & Berridge PLC

(57) ABSTRACT

When causing a power saving mode to return by inputting a return signal, power is supplied to a device to which suppliance of power has been cut off. In this case, a power-saving control CPLD is masked to cancel an uncertain signal generated in the device under an intermediate potential at which the voltage of a power-saving-time power cutoff device, which supplies power to the device, is gradually rising. Thus, an erroneous operation caused by the uncertain signal can be prevented. Further, when the voltage of the power-saving-time power cutoff device reaches an operation-guaranteeing voltage, the power-saving control CPLD reads the uncertain signal again. Thereby, intrinsic characteristics of the uncertain signal can be verified, and a secure return operation can be implemented.

18 Claims, 5 Drawing Sheets

POWER MANAGEMENT APPARATUS, POWER MANAGEMENT METHOD, AND POWER MANAGEMENT SYSTEM

BACKGROUND OF THE INVENTION

1. Field of the Invention

The present invention relates to a power management apparatus and a power management method for managing a power supply that supplies power to an electric device. In addition, the invention relates to a power management system including the power management apparatus.

2. Description of Related Art

Conventionally, a power management apparatus for supplying power to an electrical device has a function of automatically (or manually) switching to a power saving mode for suppliance of a minimal necessary power when the electrical device is inoperative for a predetermined time. Thereby, unnecessary power consumption is reduced, and consequently, resources can be conserved.

When the electrical device is in the power saving mode, the suppliance of power can be returned to a normal mode using a return signal input according to a user's desire.

In the conventional electrical device, even when the suppliance of power switches to the power saving mode, power is continually supplied to a driving control circuit mounted in the electrical device, and the return signal is monitored. Consequently, management control can be implemented so that the switch operation for switching the suppliance of power to the power saving mode and the return operation for making the suppliance of power return to the normal mode do not temporarily overlap.

However, the continual suppliance of power in the power saving mode to the driving control circuit of the electrical device conflicts with an intrinsic purpose of the power saving mode for reducing power consumption. To overcome this problem, in recent power management apparatuses, the suppliance of power to the driving control circuit is cut off in the power saving mode (or, system shutdown is caused). An electrical device used in this case has a compact complex programmable logic device (CPLD) in addition to the driving control circuit. The CPLD is continually supplied with power even in the power saving mode, and executes return control upon receipt of a return signal.

Nevertheless, in the operation of making the suppliance of power return from the power saving mode, a power-saving power supply is controlled by transistor-switching operations, and control is thereby performed for a device to which the suppliance of power has been cut off. Accordingly, the voltage of the power-saving power supply gradually rises. Consequently, a case can occur, in which the voltage of the power-saving power supply drops temporarily because of a rush current until the voltage reaches an operation-guaranteeing voltage (voltage at which the suppliance of power from the power-saving power supply is stabilized). This can cause a case, in which this device produces an uncertain signal.

A case can occur, in which the uncertain signal is input to a device, to which power is continually supplied even in the power saving mode, causing this device to operate erroneously. In particular, when a shutdown signal is input to the CPLD because of the rush current, a case can occur, in which the return operation and shutdown operation are repeated, whereby the suppliance of power cannot be returned to the normal mode.

SUMMARY OF THE INVENTION

Taking the above-described facts into consideration, an object of the present invention is to obtain a power management apparatus, a power management method, and a power management system that are each able to prevent an uncertain signal from being input to a device to which power is continually supplied from a device to which suppliance of power has been cut off when suppliance of power to an electric device switches from a power saving mode to a normal mode under conditions with a voltage insufficient to guarantee operation, thereby enabling an erroneous operation to be prevented.

A power management apparatus of a first aspect of the invention is for managing a power supply that supplies power to an electric device. the power management apparatus of the first aspect comprises: a power-saving control component which switches the suppliance of power to the electric device from a normal mode to a power saving mode for cutting off unnecessary suppliance of power when a shutdown signal is input at a predetermined time from a control system of the electric device; a monitoring component which monitors presence/absence of an input of a return signal for making the suppliance of power to the electric device return from the power saving mode to the normal mode; a return control component which switches the suppliance of power to the electric device from the power saving mode to the normal mode when the monitoring component detects the input of the return signal; and a masking component which masks an uncertain signal after the monitoring component detects the input of the return signal for a period from input of the uncertain signal from a device to which the suppliance of power has been cut off by the power saving mode until a voltage of the power supply that starts the suppliance of power to the device becomes an operation-guaranteeing voltage, at which the suppliance of power from the power supply is stabilized.

According to the power management apparatus of the first aspect, at the predetermined time, the power-saving control component starts the operation of switching the suppliance of power to the electric device from the normal mode to the power saving mode for cutting off unnecessary suppliance of power.

When the monitoring component detects the input of the return signal, the return control component starts the operation of switching the suppliance of power from the power saving mode to the normal mode.

According to the return operation of the return control component, power is supplied to the device to which power has been cut off. Accordingly, the voltage of the power supply that supplies power to the device gradually rises. In particular, in the case, in which a transistor is used to execute switching between the operations of supplying and cutting off power, the rise in voltage becomes conspicuous. While the voltage is rising, a case can occur, in which the voltage drops temporarily because of the influence of a rush current.

Even in the power saving mode, a device to which power is continually supplied exists. In this device, a problematic case could occur in which an uncertain signal, which can be caused by variations at a voltage at which the operations of the power supply are not guaranteed (voltage at which the power supply cannot stably supply the power), is recognized as a true signal.

To avoid the problematic case, the masking component is provided to mask the uncertain signal using the input of the uncertain signal in the return operation as a trigger. Thereby, an erroneous operation can be prevented; and consequently, the return operation can stably be implemented.

A power management apparatus of a second aspect of the invention, according to the power management apparatus of the first aspect, wherein the uncertain signal from the device, to which the suppliance of power has been cut off by the power saving mode, is the shutdown signal.

According to the power management apparatus of the second aspect, the shutdown signal is transmitted from a driving control circuit on the side of the electric device to which the suppliance of power has been cut off in the power saving mode. When the shutdown signal is generated following the voltage variations described above, a problematic case can occur in which the return operation and a shutdown operation are repeated, and the suppliance of power may not be returned to the normal mode. To avoid the problematic case, the shutdown signal is masked to enable the return operation to securely be implemented.

A power management apparatus of a third aspect of the invention, according to the power management apparatus of the first aspect, wherein the power management apparatus is controlled by a compact complex programmable logic device, which does not participate in control of a driving control circuit at the electric device side.

According to the power management apparatus of the third aspect, the power management apparatus does not need to be controlled in the driving control circuit at the electric device side. Reduction in power consumption, which is an intrinsic purpose of the power saving mode, can be sufficiently exhibited.

A power management apparatus of a fourth aspect of the invention, according to the power management apparatus of the third aspect, wherein power is supplied only to the compact complex programmable logic device in the power saving mode.

According to the power management apparatus of the fourth aspect, in the power saving mode, it is sufficient to supply power only to the compact complex programmable logic device. Hence, the reduction in power consumption by the power saving mode can be efficiently implemented.

A power management apparatus of a fifth aspect of the invention, according to the power management apparatus of the first aspect, wherein the masking component operates in such a manner that a count is started upon the input of the uncertain signal, and the uncertain signal is not accepted until the count reaches predetermined count value.

According to the power management apparatus of the fifth aspect, since a counter is used, while the device configuration is simple, the masking of the uncertain signal can be implemented.

A power management apparatus of a sixth aspect of the invention is for managing a power supply that supplies power to an electric device. the power management apparatus of the sixth aspect comprises: a detecting component which detects an input of a return signal for making the suppliance of power to the electric device return to a normal mode from a power saving mode, which cuts off unnecessary suppliance of power; a return control component which switches the suppliance of power to the electric device from the power saving mode to the normal mode when the detecting component detects the input of the return signal; and a masking component which masks an uncertain signal input from a device, to which the suppliance of power has been cut off by the power saving mode, for a predetermined period after the detecting component detects the input of the return signal.

A power management method of the invention is for managing a power supply that supplies power to an electric device the power management method comprises the steps of: detecting an input of a return signal for making the suppliance of power to the electric device return to a normal mode from a power saving mode, which cuts off unnecessary suppliance of power; switching the suppliance of power to the electric device from the power saving mode to the normal mode when the input of the return signal is detected; and masking an uncertain signal input from a device, to which the suppliance of power has been cut off by the power saving mode, for a predetermined period after the input of the return signal is detected.

A power management system of the invention comprises: the power management apparatus of claim 6; the electric device; the power supply; and an instructing apparatus for providing an instruction to the electric device.

DESCRIPTION OF THE PREFERRED EMBODIMENTS

Figure 1:
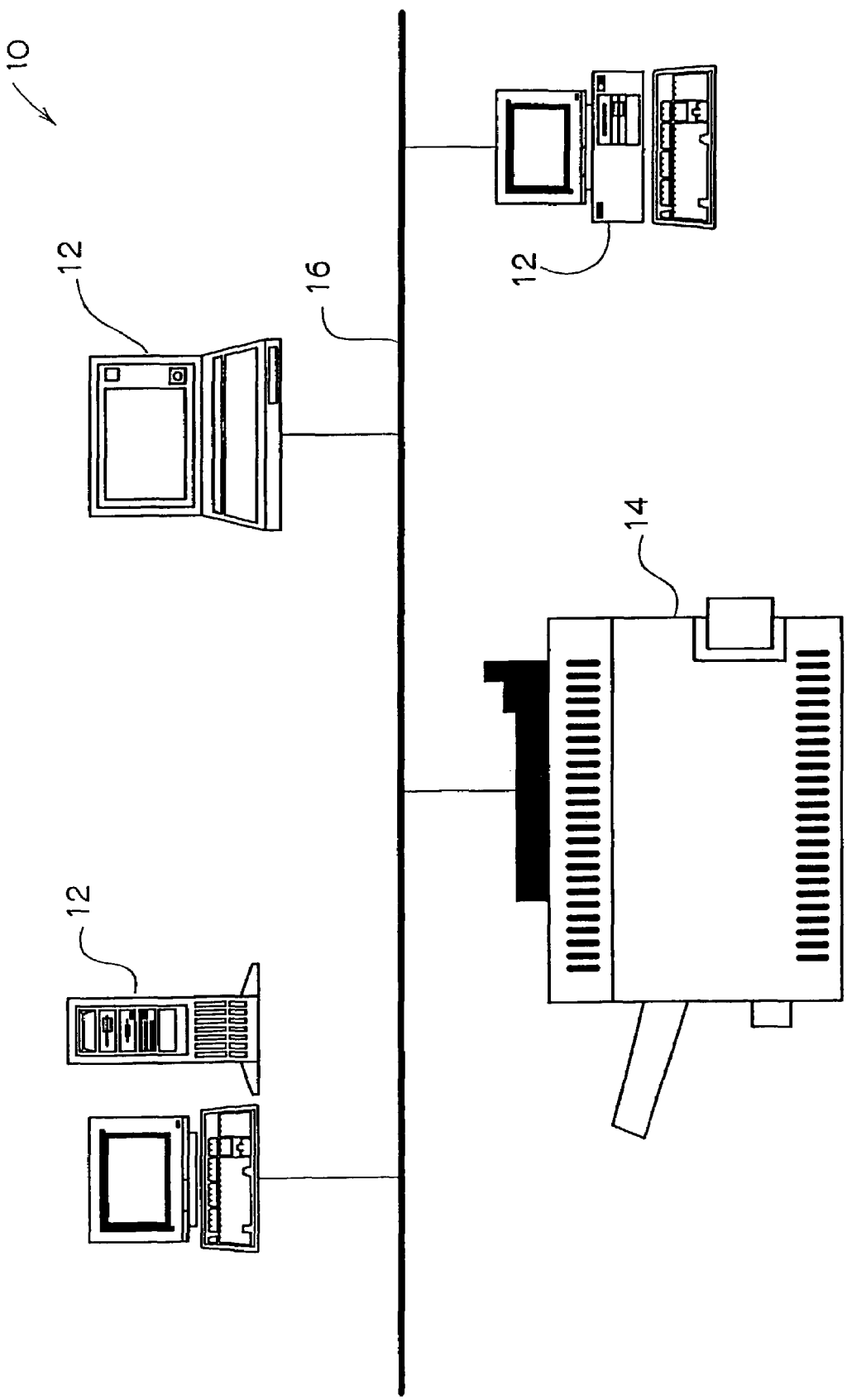
FIG. 1 is a schematic view of a printer system according to an embodiment of the present invention.

FIG. 1 shows a printer system 10 according to an embodiment of the present invention as a power management system in which printer control can be executed.

The printer system 10 includes a plurality of personal computers 12 (PCs) individually used as print-instructing apparatuses (instructing apparatuses) disposed on a plurality of desks at which individual users carry out work in an office. In addition, the printer system 10 includes a plurality of electric devices, specifically printers 14, distributed to individual sections in the office. The plurality of the PCs 12 and the plurality of printers 14 are connected via a network 16 such as a LAN (local area network).

Figure 2:
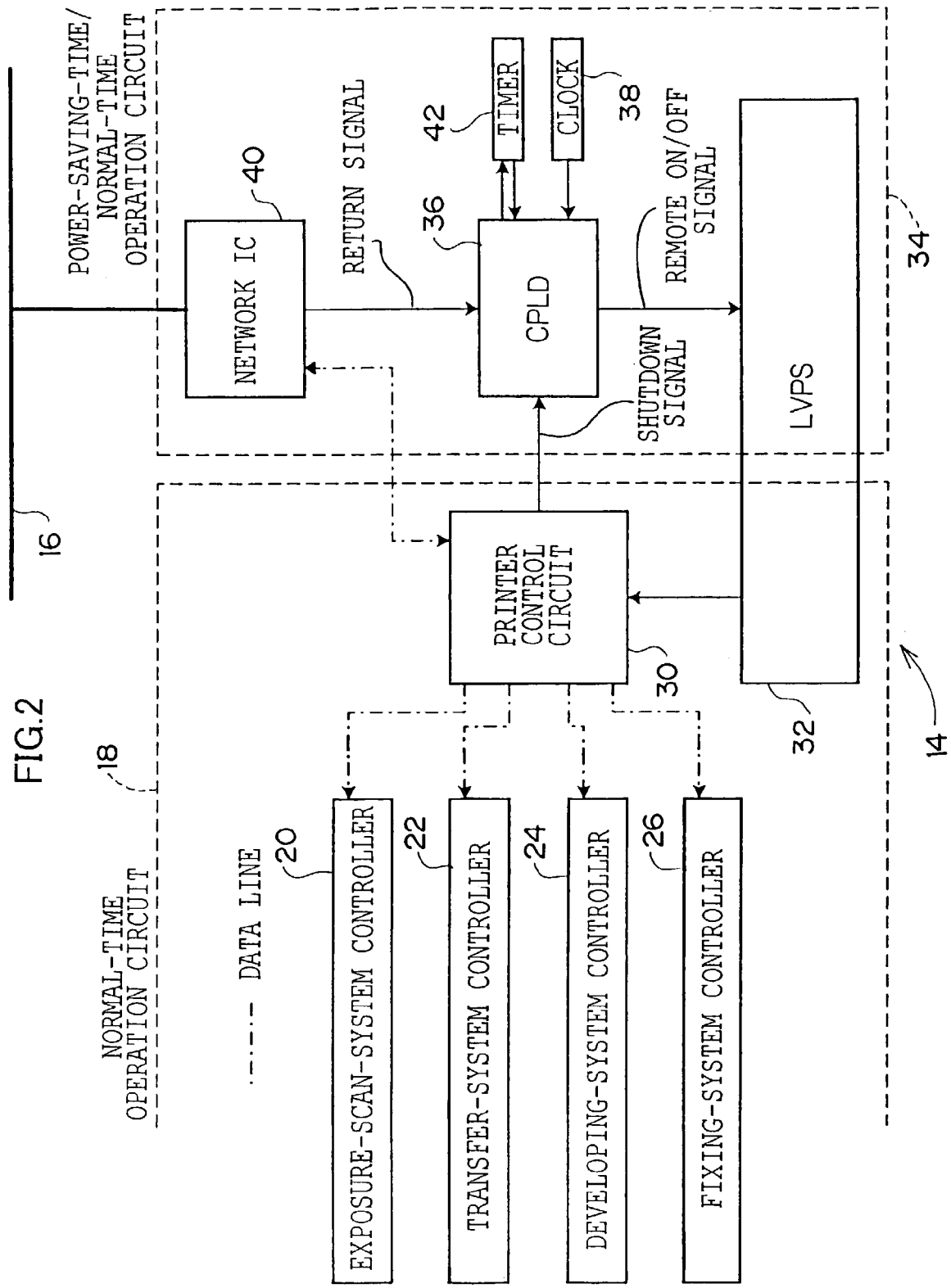
FIG. 2 is a control block diagram of a printer including a power management apparatus according to the embodiment of the invention.

FIG. 2 shows a control block diagram of the printer 14.

A printer controller 18 is connected to an exposure-scan-system controller 20, a transfer-system controller 22, a developing-system controller 24, and a fixing-system controller 26 (these controllers will generically be referred to as control systems 60 depending on the case, hereinbelow). An operation control signal is transmitted to each of the control systems 60 from a printer control circuit 30 that constitutes a control system of the electric device as a driving control circuit at the electric device side. Power is supplied to a drive system 54 (shown in FIG. 3) connected to each of the control systems 60.

The printer control circuit 30 is supplied with an operation power of a stabilized predetermined voltage (for example, 3.3 V) from a LVPS 32 (low voltage power supply) as a power supply.

The LVPS 32 is configured so that the suppliance of power is controlled by a power management apparatus 34. That is, the power management apparatus 34 controls the operation of the LVPS 32. In addition, the operation state of the printer 14 is controlled in the power management apparatus 34. Specifically, a normal mode and a power saving mode of the printer 14 are provided to be selectively switchable. In the normal mode, power is supplied to all the control systems 60 (including the drive system 54) and the printer control circuit 30. In the power saving mode, power to all the control systems 60 (including the drive system 54) and the printer control circuit 30 is cut off and power consumption is reduced.

The power management apparatus 34 includes a compact complex programmable logic device 36 (CPLD) provided as a power-saving control component and as a control device. The CPLD 36 can continue operation in both the normal mode and the power saving mode. A shutdown signal (energy-saving shift signal) is input to the CPLD 36 from the printer control circuit 30 at a predetermined time. The CPLD 36 is enabled by a clock 38 to continue the operation.

Upon input of the shutdown signal to the CPLD 36, the CPLD 36 transmits a remote OFF signal (power-supply OFF signal) to the LVPS 32. Thereby, in the LVPS 32, control of the suppliance of power to the printer control circuit 30 is cut off (the power saving mode).

The power management apparatus 34 includes a network IC 40 for receiving a signal from the network 16. Upon receipt of a printer-operation instruction input according to a user's desire from the personal computers 12 connected to the network 16, a return signal is transmitted from the network IC 40 to the CPLD 36.

In response to the input of the return signal, the CPLD 36 outputs a remote ON signal (power-supply ON signal) to the LVPS 32. Thereby, in the LVPS 32, control of the suppliance of power to the printer control circuit 30 is executed (the normal mode).

Figure 3:
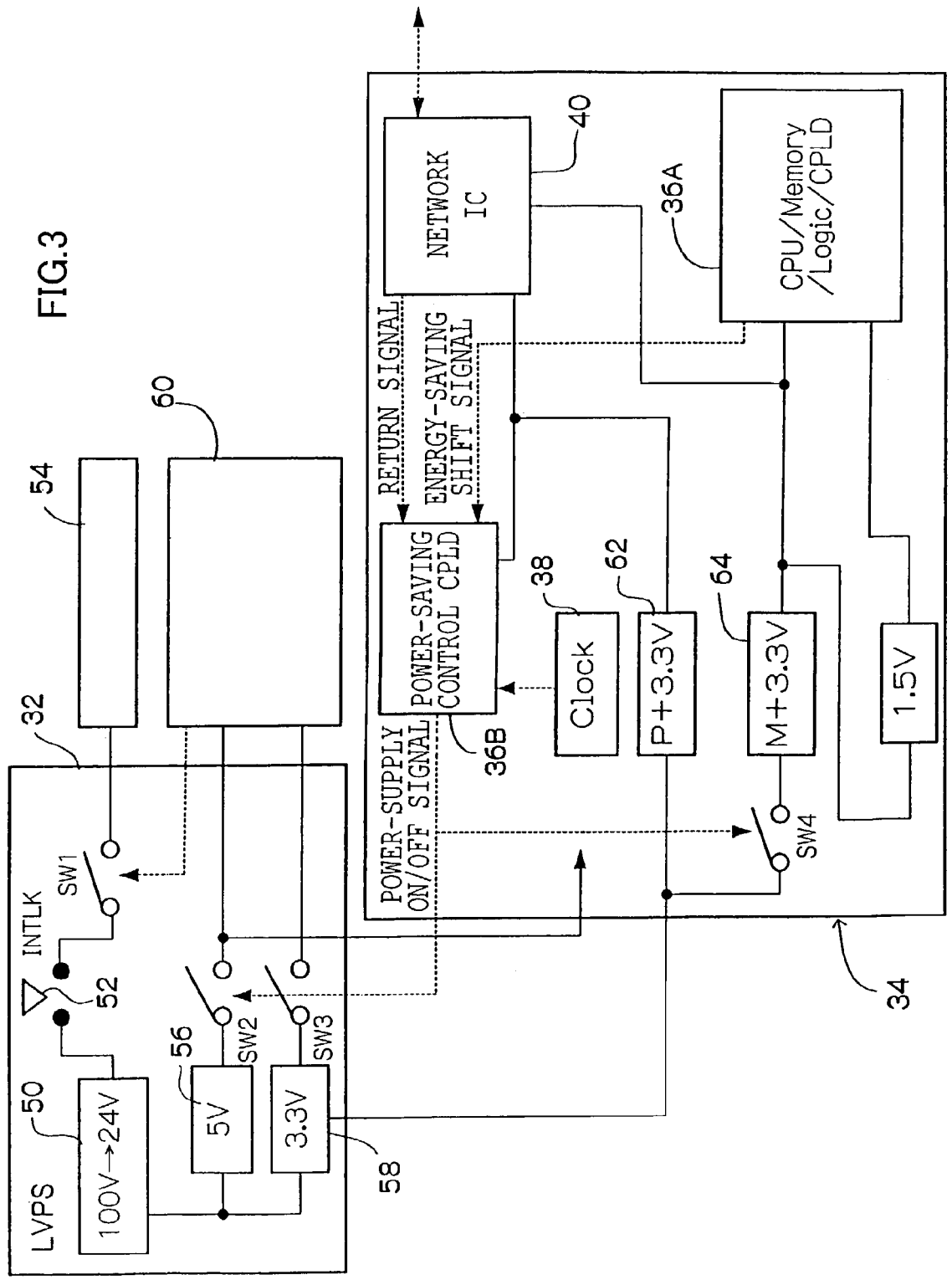
FIG. 3 is block diagram showing a power-supply control system in a LVPS and a CPLD.

FIG. 3 shows a detailed view of a power-supply control system in the LVPS 32 and the CPLD 36.

In the LVPS 32, a converter 50 for converting a power-supply voltage of 100 volts (V) into 24 V is provided. In the LVPS 32, a switch SW1 is turned ON in the ON state of an INTLK 52 according to a signal on the side of the printer 14, and power is thereby supplied to the drive system 54 of the printer 14.

In addition, the converter 50 is connected to a 5V stabilizing power supply 56 and a 3.3 V stabilizing power supply 58. The 5V stabilizing power supply 56 and the 3.3 V stabilizing power supply 58 supply power of the respective voltages to the individual control systems 60 (the exposure-scan-system controller 20, the transfer-system controller 22, the developing-system controller 24, and the fixing-system controller 26, which are shown in FIG. 2) of the printer 14. Power is supplied to the control systems 60 by the ON/OFF control of switches SW2 and SW3.

In addition, the 5V stabilizing power supply 56 and the 3.3 V stabilizing power supply 58 supply power of the respective voltages to the power management apparatus 34.

A power line extending from the 3.3 V stabilizing power supply 58 is branched to a continuous power-supply device 62 (P+3.3 V) and a power-saving-time power cutoff device 64 (M+3.3 V). A switch SW4 is connected to a power line extending up to the power-saving-time power cutoff device 64. The suppliance or cutoff operation of power is controlled by the ON/OFF control of the switch SW4.

The switch SW4 is formed using a switching transistor. The power-saving-time power cutoff device 64 is connected to a device of the network IC 40. The power-saving-time power cutoff device 64 is connected, directly or with being stepped down by 1.5 V, to a device 36A (including a memory, a CPU, and the like) that partly constitutes the CPLD 36 of the power management apparatus 34. The shutdown signal from the printer control circuit 30 is received by the device 36A, and is controlled by a power-saving control CPLD 36B that serves as a monitoring component (a detecting component), a return control component, and a masking component.

The continuous power supply 62 supplies power to the power-saving control CPLD 36B and portions of the network IC 40. This enables the operation states of the power-saving control CPLD 36B and the portions of the network IC 40 to be continually maintained.

In the configuration described above, upon input of the return signal to the power-saving control CPLD 36B, the remote ON signal drives the switches SW2 and SW3 of the LVPS 32 and the switch SW4 of the power management apparatus 34 to the ON state. In this case, however, the voltage in the switch SW4 gradually increases because of the property of the transistor used therefor. At this time, a rush current occurs in the switch SW4, thereby causing an unstable voltage variation (intermediate voltage) in which the voltage drops temporarily.

For the reason described above, an erroneous operation occurs with the device 36A that, as originally designed, transmits signals to the power-saving control CPLD 36B according to the shutdown signal received from the printer control circuit 30. Thereby, a case can occur, in which the device 36A transmits to the power-saving control CPLD 36B a signal (uncertain signal) in a manner equivalent to that in the case, in which the shutdown signal is received.

Consequently, the invention is arranged such that, in the power-saving control CPLD 36B, after input of the uncertain signal, masking of the input is executed by using the clock 38. Thereby, input of the uncertain signal can be prevented.

Hereinbelow, operations of the embodiment are described.

In the normal mode, a power of a predetermined power-supply voltage is supplied from the LVPS 32 to the printer control circuit 30. In addition, power is supplied from the LVPS 32 to the individual control systems 60, which are controlled by the printer control circuit 30, and the drive system 54.

When the printer 14 enters an operation standby state for a predetermined time, the printer control circuit 30 transmits a shutdown signal to the CPLD 36. In according with the received signal, a remote OFF signal is transmitted from the CPLD 36 to the LVPS 32, and the suppliance of power from the LVPS 32 to the printer control circuit 30 is cut off. Thereby, the power to the printer 14 is cut off overall (power saving mode).

Upon receipt of a printer-operation instruction from the personal computer 12 via the network 16, a return signal is input to the CPLD 36 from the network IC 40. According to the return signal, the CPLD 36 outputs a remote ON signal to the LVPS 32.

In response to the signal, the LVPS 32 supplies power to the printer control circuit 30, thereby enabling the printer 14 to activate (normal mode).

In this case, when the return signal is input to the power-saving control CPLD 36B, a problem can occur, as follows. That is, the voltage in the switch SW4 gradually increases because of the property of the transistor used therefor. At this event, a rush current occurs in the switch SW4, thereby causing an unstable voltage variation (intermediate voltage) in which the voltage drops temporarily. For this reason, an erroneous operation occurs with the device 36A (a CPU of the CPLD 36) that, as originally designed, transmits signals to the power-saving control CPLD 36B according to the shutdown signal received from the printer control circuit 30. Thereby, a case can occur, in which the device 36A transmits to the power-saving control CPLD 36B a signal (uncertain signal) in the manner equivalent to that in the case, in which the shutdown signal is received.

However, the present embodiment is arranged such that, in the power-saving control CPLD 36B, after input of the uncertain signal, masking of the input is executed. Thereby, input of the uncertain signal can be prevented.

Hereinbelow, the state of the signal in the return operation described above will be described according to a timing chart of FIG. 4.

Figure 4:
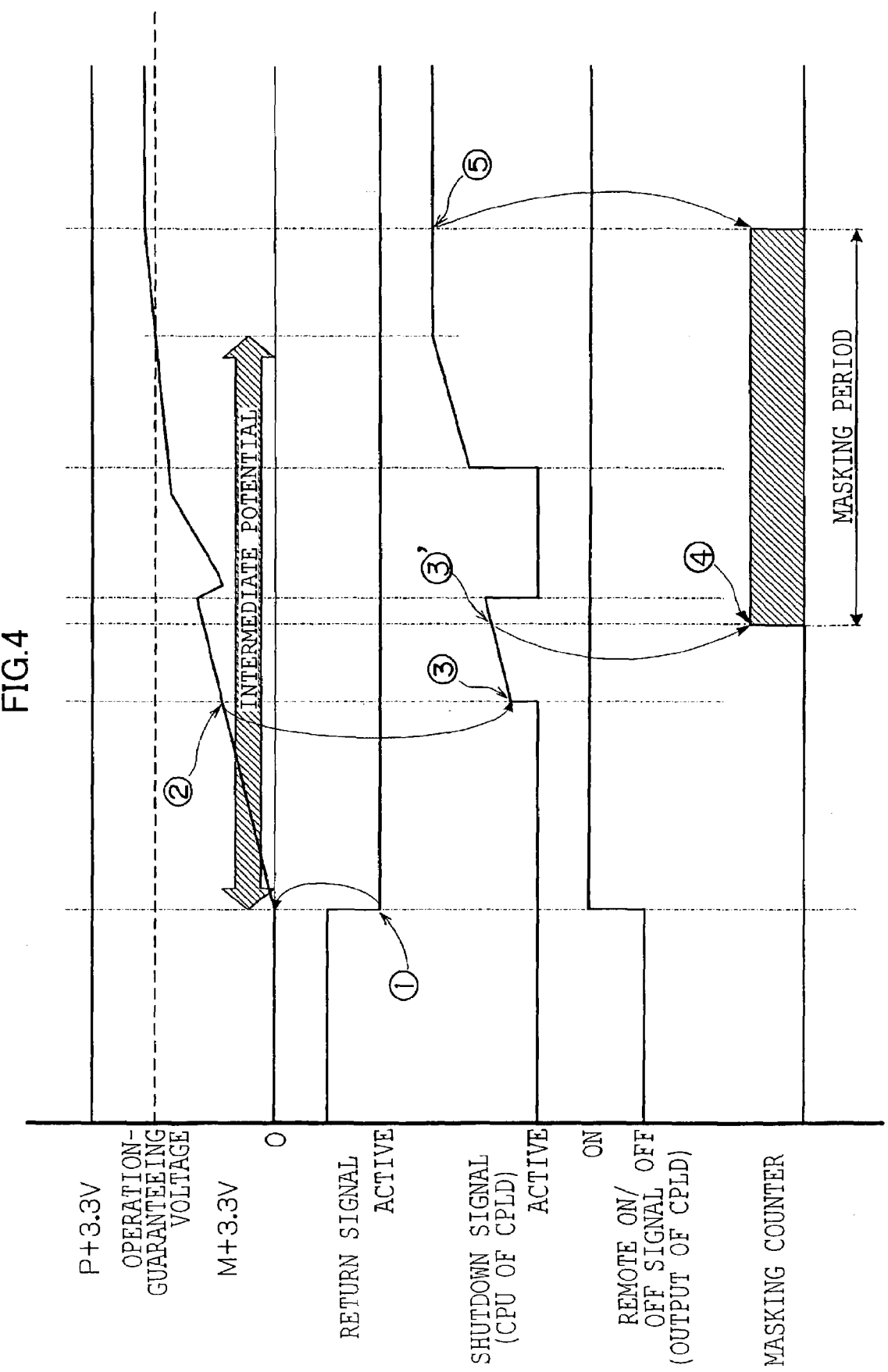
FIG. 4 is a timing chart relating to a return operation according to the embodiment of the invention.

As shown by number (1) in FIG. 4, when the return signal becomes active, the switch SW4 turns ON. Thereby, the power-saving-time power cutoff device 64 (M+3.3 V), which is set to 0 V in the power-saving time, is started to supply power.

As is shown by a wide line arrow in FIG. 4, the voltage of the power-saving-time power cutoff device 64 enters the state of intermediate potential that gradually rises. In this state, when the voltage of the power-saving-time power cutoff device 64 becomes a predetermined potential (refer to number (2) in FIG. 4), a shutdown signal is input to the power-saving control CPLD 36B (intrinsically, this shutdown signal is output from the device 36A (the CPU) of the CPLD 36 according to a shutdown signal from the printer control circuit 30)(refer to number (3) in FIG. 4). However, this shutdown signal is in fact an uncertain signal generated under the condition, in which the voltage of the power-saving-time power cutoff device 64 is at the intermediate potential. In other words, the shutdown signal is an unreliable signal.

Consequently, from the time when the input of the uncertain signal reaches the predetermined level (refer to number (3)' in FIG. 4), operation of a masking counter is started in the power-saving control CPLD 36B (refer to number (4) in FIG. 4).

During the masking operation, the uncertain signal changes to an unstable voltage due to, for example, a voltage rise and/or a voltage drop because of a rush current in the power-saving-time power cutoff device 64. However, since the power-saving control CPLD 36B does not allow the uncertain signal to be input in any way, a case, in which the power-saving control CPLD 36B erroneously operates, does not occurs.

The masking period continues until the intermediate potential terminates, specifically, until the voltage of the power-saving-time power cutoff device 64 (M+3.3 V) reaches an operation-guaranteeing voltage (voltage at which the operation (suppliance of power) of the power-saving-time power cutoff device 64 is stabilized). Accordingly, when the masking period is over, the uncertain signal is stable, and power-saving control CPLD 36B reads the uncertain signal stabilized again (refer to number (5) in FIG. 4).

Normally, during a return operation, the shutdown signal is not input to the power-saving control CPLD 36B. Therefore, the power-saving control CPLD 36B transmits the remote ON signal to the LVPS 32, whereby the return operation is securely performed.

Figure 5:
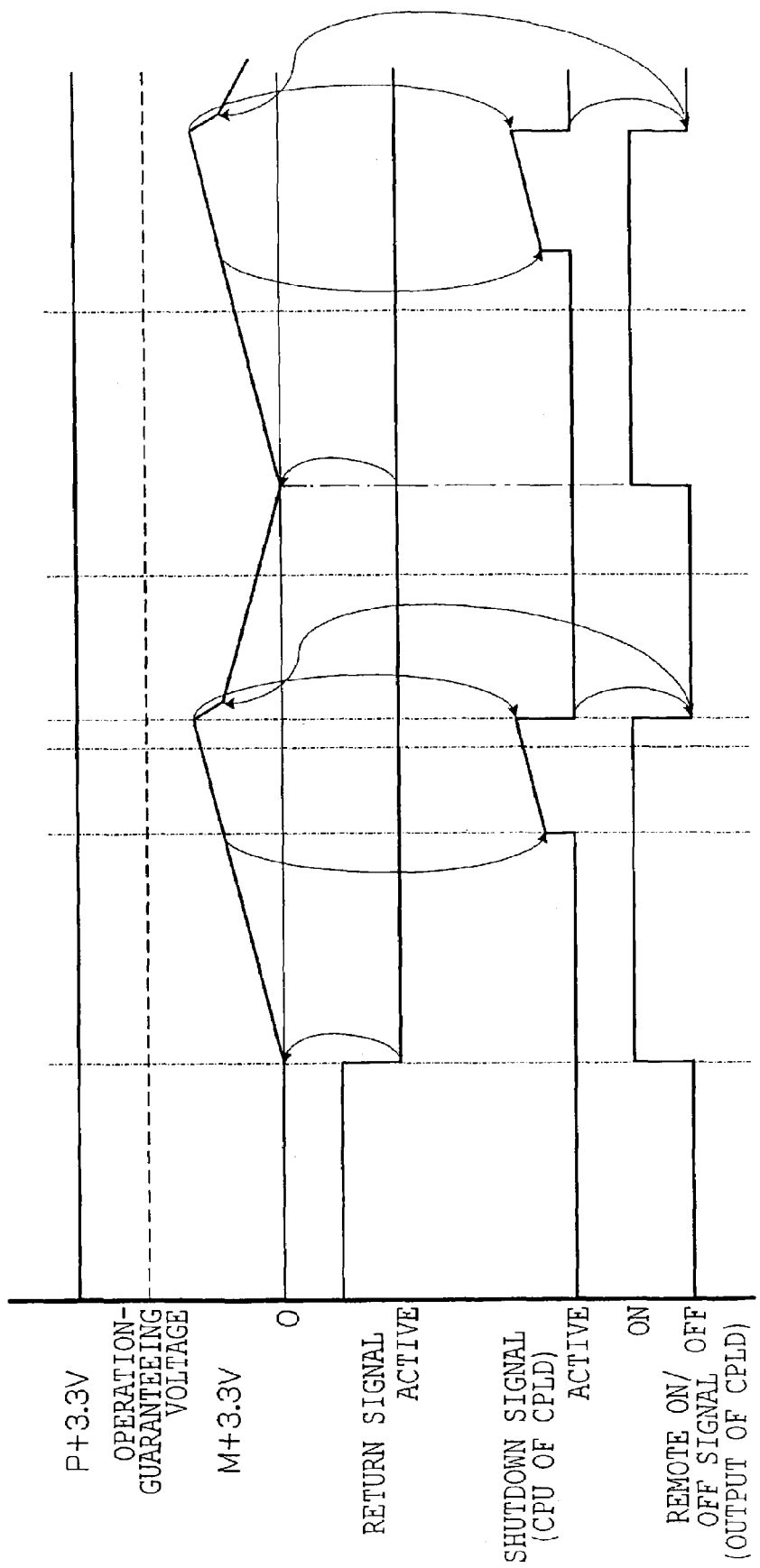
FIG. 5 is a timing chart of an example of a conventional return operation corresponding to that shown in FIG. 4.

FIG. 5 is a timing chart in a conventional case, in which masking is not performed. In this case, an uncertain signal in the intermediate potential causes the return operation and the shutdown operation to be repeated, thereby disabling the suppliance of power to return.

As described above, according to the present embodiment, when causing the suppliance of power to return from the power saving mode by inputting the return signal, power is supplied to the device 36A to which the suppliance of power has been cut off. In this case, the power-saving control CPLD 36B is masked to cancel the uncertain signal generated in the device 36A under the intermediate potential at which the voltage of the power-saving-time power cutoff device 64, which supplies power to the device 36A, is gradually rising. Thereby, an erroneous operation caused by the uncertain signal can be prevented.

Further, when the voltage of the power-saving-time power cutoff device 64 reaches the operation-guaranteeing voltage, the power-saving control CPLD 36B is controlled to read the uncertain signal stabilized again. Thereby, the intrinsic characteristics of the uncertain signal can be verified, and a secure return operation can be implemented.

The embodiment is thus described with reference to the printer 14 as an example of the electric device that selectively switches the suppliance of power between the normal mode and the power saving mode. However, the invention can be applied to any of power-savings effective devices including office automation devices, such as a facsimile machine and a photocopy reproduction machine, and home-use electric devices.

What is claimed is:

1. A power management apparatus which manages a power supply that supplies power to an electric device, the power management apparatus comprising:
    a power-saving control component which switches the suppliance of power to the electric device from a normal mode to a power saving mode for cutting off unnecessary suppliance of power when a shutdown signal is input at a predetermined time from a control system of the electric device;
    a monitoring component which monitors presence/absence of an input of a return signal for making the suppliance of power to the electric device return from the power saving mode to the normal mode;
    a return control component which switches the suppliance of power to the electric device from the power saving mode to the normal mode when the monitoring component detects the input of the return signal; and
    a masking component which masks an uncertain signal after the monitoring component detects the input of the return signal for a period that starts by input of the uncertain signal from a device to which the suppliance of power has been cut off by the power saving mode and does not end until a voltage of the power supply that starts the suppliance of power to the device becomes an operation-guaranteeing voltage, at which the suppliance of power from the power supply is stabilized, wherein the uncertain signal is the shutdown signal, and is output from the electric device and input to the power-saving control component which is in operation both in the normal mode and the power saving mode.

2. A power management apparatus according to claim 1, wherein the power management apparatus is controlled by a compact complex programmable logic device, which does not participate in control of a driving control circuit at the electric device side.

3. A power management apparatus according to claim 2, wherein power is supplied only to the compact complex programmable logic device in the power saving mode.

4. A power management apparatus according to claim 1, wherein the masking component operates in such a manner that a count is started upon the input of the uncertain signal, and the uncertain signal is not accepted until the count reaches predetermined count value.

5. A power management apparatus according to claim 1, wherein the period starts when the input of the uncertain signal has reached a predetermined level.

6. A power management apparatus which manages a power supply that supplies power to an electric device, the power management apparatus comprising:
a power-saving control component which switches the suppliance of power to the electric device from the normal mode to the power saving mode for cutting off unnecessary suppliance of power when a shutdown signal is input;
a detecting component which detects an input of a return signal for making the suppliance of power to the electric device return to the normal mode from the power saving mode;
a return control component which switches the suppliance of power to the electric device from the power saving mode to the normal mode when the detecting component detects the input of the return signal; and
a masking component which masks an uncertain signal input from a device, to which the suppliance of power has been cut off by the power saving mode, for a predetermined period that starts by input of the uncertain signal after the detecting component detects the input of the return signal, wherein the uncertain signal is a shutdown signal, and is output from the electric device and input to the power-saving control component which is in operation both in the normal mode and the power saving mode.

7. A power management apparatus according to claim 6, wherein the predetermined period includes a period from the input of the uncertain signal until a voltage of the power supply that supplies power to the device becomes an operation-guaranteeing voltage, at which the suppliance of power from the power supply is stabilized.

8. A power management apparatus according to claim 6, wherein the power management apparatus is controlled by a control device, which does not participate in driving control of the electric device.

9. A power management apparatus according to claim 8, wherein power is supplied to the control device in the power saving mode.

10. A power management apparatus according to claim 6, wherein the masking component masks the uncertain signal until a count value of a count, which is started upon the input of the uncertain signal, reaches a predetermined count value.

11. A power management system comprising:
the power management apparatus of claim 6;
the electric device;
the power supply; and
an instructing apparatus for providing an instruction to the electric device.

12. A power management apparatus according to claim 6, wherein the predetermined period starts when the input of the uncertain signal has reached a predetermined level.

13. A power management method which manages a power supply that supplies power to an electric device, the power management method comprising the steps of:
switching, by a control device, the suppliance of power to the electric device from a normal mode to a power saving mode for cutting off unnecessary suppliance of power when a shutdown signal is input;
detecting an input of a return signal for making the suppliance of power to the electric device return to the normal mode from the power saving mode;
switching the suppliance of power to the electric device from the power saving mode to the normal mode when the input of the return signal is detected; and
masking an uncertain signal input from a device, to which the suppliance of power has been cut off by the power saving mode, for a predetermined period that starts by input of the uncertain signal after the input of the return signal is detected, wherein the uncertain signal is a shutdown signal, and is output from the electric device and input to the control device which is in operation both in the normal mode and the power saving mode.

14. A power management method according to claim 13, wherein the predetermined period is set to include a period from the input of the uncertain signal until a voltage of the power supply that supplies power to the device becomes an operation-guaranteeing voltage, at which the suppliance of power from the power supply is stabilized.

15. A power management method according to claim 13, wherein the power management method is controlled by the control device, which does not participate in driving control of the electric device.

16. A power management method according to claim 15, wherein power is supplied to the control device in the power saving mode.

17. A power management method according to claim 13, wherein the uncertain signal is masked until a count value of a count, which is started upon the input of the uncertain signal, reaches a predetermined count value.

18. A power management method according to claim 13, wherein the predetermined period starts when the input of the uncertain signal has reached a predetermined level.

* * * * *